United States Patent
Watanabe et al.

[19]

[11] Patent Number: 5,926,837
[45] Date of Patent: Jul. 20, 1999

[54] MEMORY SYSTEM CAPABLE OF REDUCING TIMING SKEW BETWEEN CLOCK SIGNAL AND DATA

[75] Inventors: Naoya Watanabe; Yoshikazu Morooka, both of Hyogo, Japan

[73] Assignee: Mitsubishi Denki Kabushiki Kaisha, Tokyo, Japan

[21] Appl. No.: 08/815,989

[22] Filed: Mar. 10, 1997

[30] Foreign Application Priority Data

Nov. 13, 1996 [JP] Japan .................................. 8-301850

[51] Int. Cl.$^6$ ...................................... G06F 13/16
[52] U.S. Cl. ..................... 711/167; 711/154; 395/878; 395/306
[58] Field of Search ..................... 395/878, 828, 395/845, 856, 306; 711/154, 100, 167

[56] References Cited

U.S. PATENT DOCUMENTS

| 4,663,758 | 5/1987 | Lambarelli et al. | 370/431 |
| 5,210,750 | 5/1993 | Nassehi et al. | 370/440 |
| 5,268,656 | 12/1993 | Muscavage | 331/45 |
| 5,432,823 | 7/1995 | Gasbarro et al. | 375/356 |

FOREIGN PATENT DOCUMENTS 6-223037  8/1994  Japan .

OTHER PUBLICATIONS

"A 32–bank IGb DRAM with IGB/s Bandwidth", *Digest of Technical Press*, pp. 378–379, ISSC/Feb. 10, 1996/Buena Vista/3:45PM.

*Primary Examiner*—John W. Cabeca
*Assistant Examiner*—Christopher S. Chow
*Attorney, Agent, or Firm*—McDermott, Will & Emery

[57] ABSTRACT

A memory system includes a data bus which is folded, a clock signal line extending in parallel with the data bus for transferring a clock signal, memories connected to the data bus and the clock signal line, and memories controller for controlling the memories, wherein the memory controller generates a clock signal to supply it to one end of the clock signal line, and is responsive to a clock signal input from another end of the clock signal line to receive data output from the memory from one end of the data bus.

10 Claims, 10 Drawing Sheets

MEMORY SYSTEM CAPABLE OF REDUCING TIMING SKEW BETWEEN CLOCK SIGNAL AND DATA

BACKGROUND OF THE INVENTION

1. Field of the Invention

The present invention relates to a memory system provided with a memory operating in synchronization with a clock signal.

2. Description of the Background Art

Figure 8:
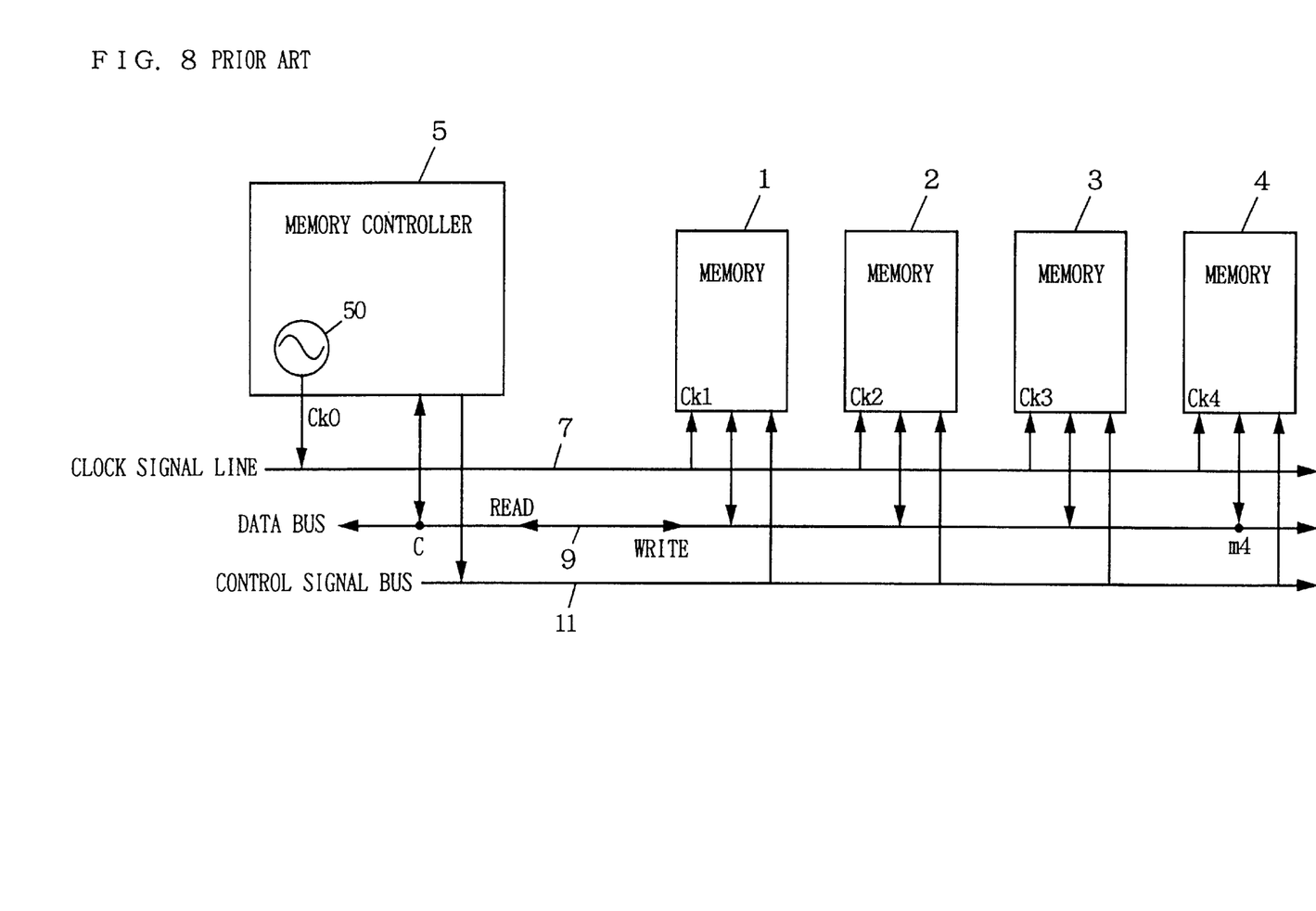
FIG. 8 is a diagram showing the structure of a conventional memory system.
Figures 9A, 9B, 9C, 9D, 9E:
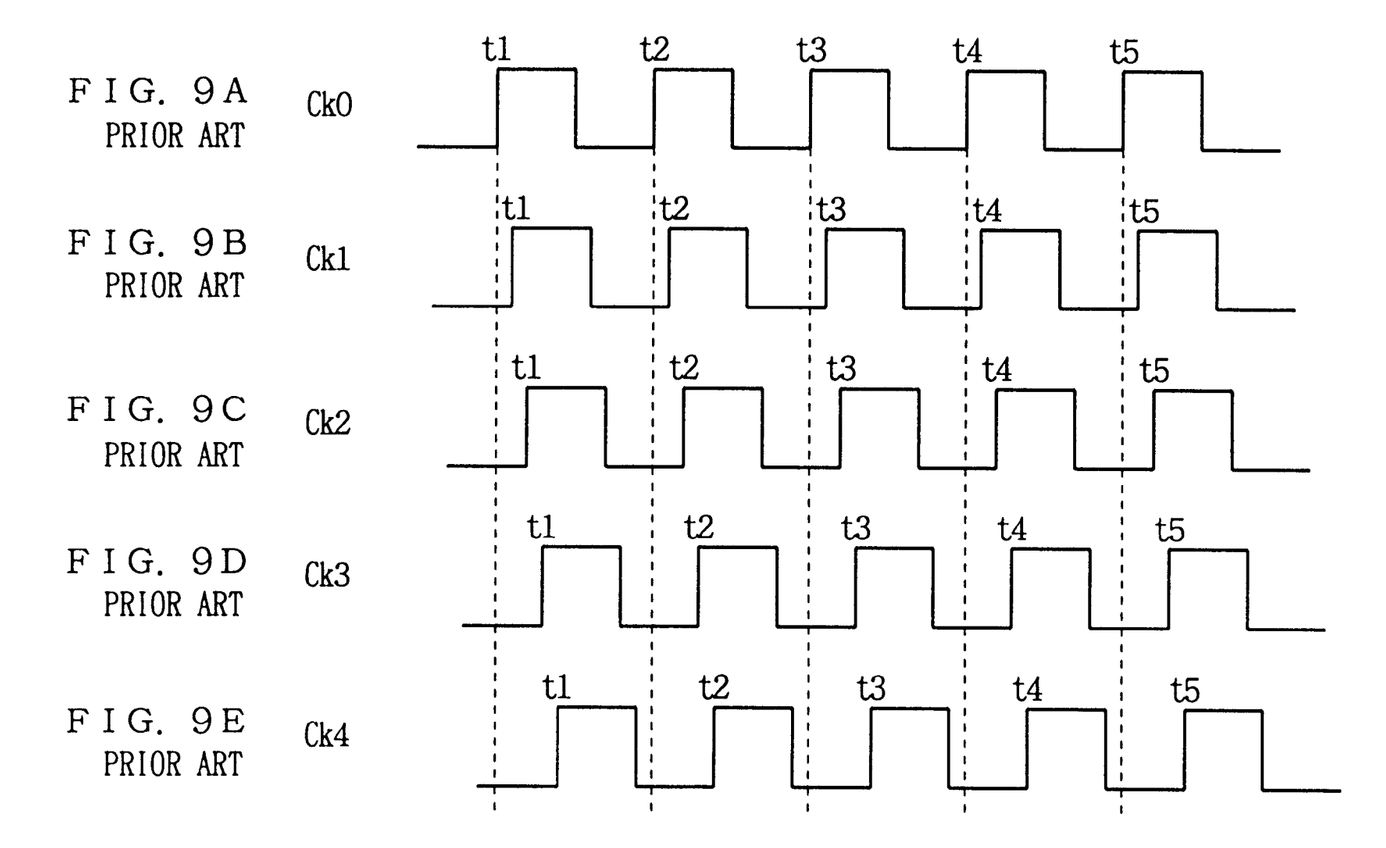
FIGS. 9A–9E are timing charts for use in illustration of the delay of a clock signal in the memory system shown in FIG. 8.

FIG. 8 shows the structure of a conventional memory system. As shown in FIG. 8, a clock generator 50 included in a memory controller 5 generates a clock signal Ck0. This clock signal Ck0 is transferred through a clock signal line 7 to be input to a memory 1 as clock signal Ck1, to a memory 2 as clock signal Ck2, to a memory 3 as clock signal Ck3, and to a memory 4 as clock signal Ck4. Memories 1 to 4 operate in synchronization with corresponding clock signals Ck1 to Ck4.

A data bus 9 transfers write data output from memory controller 5 to memories 1 to 4, and read data output from memories 1 to 4 to memory controller 5. In other words, data bus 9 transfers data bidirectionally.

A control signal for memories 1 to 4 is output from memory controller 5 and transferred through a control signal bus 11 to memories 1 to 4.

In such a memory system carrying out synchronizing operation as described above, however, a skew between a clock signal and data is produced as a frequency of the clock signal is increased, causing malfunction.

In addition, a larger skew between a clock signal and data is produced in a larger system in which the distance between a memory controller and a memory is larger.

FIG. 9A–9E are timing charts showing the timing of clock signals Ck1 to Ck4 respectively input to memories 1 to 4 shown in FIG. 8.

Clock signal Ck0 output from memory controller 5 delays in transmission through clock signal line 7. Therefore, clock signal Ck0 with larger delay is input to a memory located at a greater distance away from memory controller 5 which is a clock signal source. Accordingly, clock signals Ck1 to Ck4 have longer delay time with respect to clock signal Ck0 in this order, as shown in FIGS. 9A–9E. As a result, even if memories 1 and 4 for example trigger operation in response to the same timing edge of clock signal Ck0 output from memory controller 5, these two memories 1 and 4 start operating at a different time.

FIGS. 10A–10F are timing charts for use in illustration of data transfer in memories 1 and 4. Note that it is herein assumed that memories 1 and 4 have the same performance.

Figure 10A:
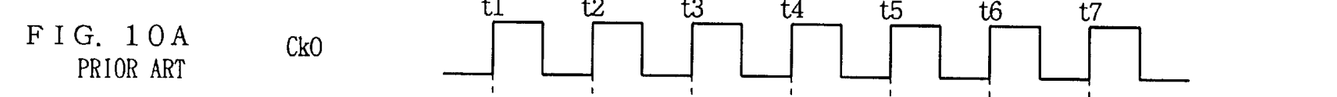
FIGS. 10A–10F are timing charts for use in illustration of operation of the memory system shown in FIG. 8.
Figure 10B:
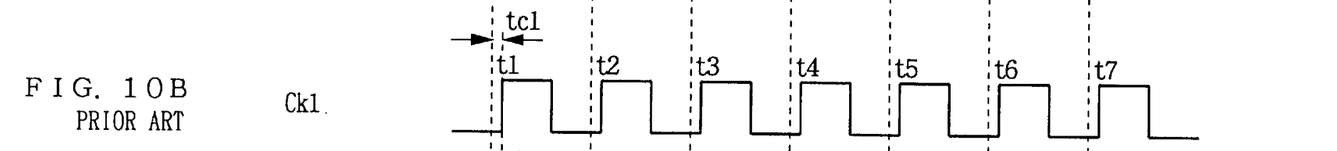
Figure 10C:
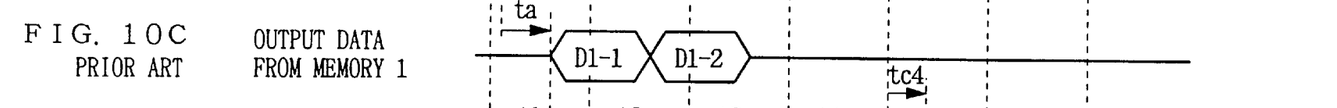

As shown in FIG. 10B and FIG. 10C, data D1-1 and D1-2 are successively output from memory 1 onto data bus 9 in accordance with clock edges (rising edges, in this case) t2 and t3 of clock signal Ck1 after the passage of time ta from rising edges t1 and t2 of clock signal Ck1 respectively.

Figure 10D:
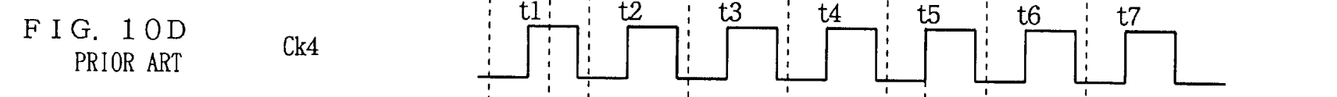
Figures 10E, 10F:
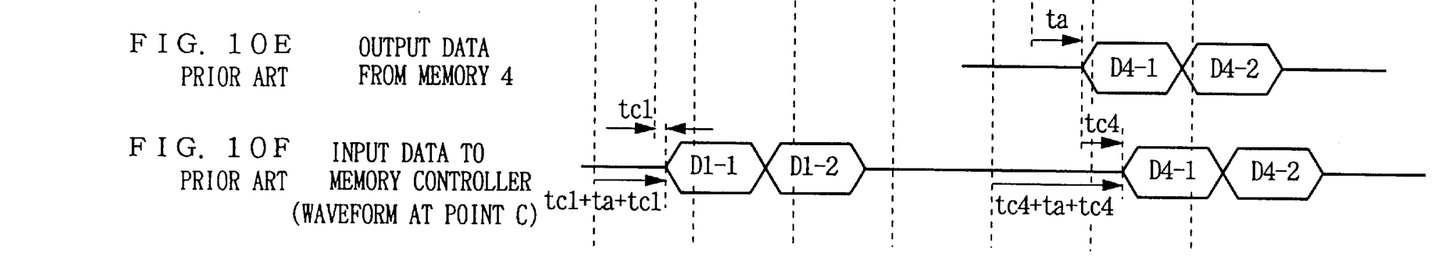

In this case, as shown in FIG. 10D and FIG. 10E, data D4-1 and D4-2 are successively output from memory 4 onto data bus 9 in accordance with clock edges (rising edges, in this case) t6 and t7 of clock signal Ck4 after the passage of time ta from rising edges t5 and t6 of clock signal Ck4, respectively.

Clock signals Ck1 and Ck4, however, result from the same clock signal Ck0, generated at clock generator 50, being input to memories 1 and 4, respectively. Time tc1 indicates signal delay time between memory controller 5 and memory 1, and time ta indicates data access time of a memory from a clock edge. In addition, time tc4 indicates signal delay time between memory controller 5 and memory 4.

As shown in FIG. 10B and FIG. 10C, data D1-1 is output from memory 1 in response to clock edge (rising edge, in this case) t1 of clock signal Ck1. And as shown in FIG. 10A and FIG. 10F, the data reaches the point C of FIG. 8 after delay time (tc1+ta+tc1) and is input to memory controller 5. Since memory 1 is close in position to memory controller 5, memory controller 5 can receive data D1-1 in accordance with clock edge (rising edge) t2 of clock signal Ck0 as trigger. However, memory 4 is located far away from memory controller 5 and therefore time tc4 is longer than time tc1. Accordingly, memory controller 5 cannot receive data D4-1 output from memory 4 in response to clock edge t5 of clock signal Ck4 as shown in FIG. 10D and FIG. 10E in accordance with clock edge t6 of clock signal Ck0 as trigger.

Thus, it is difficult for memory controller 5 in a high-speed memory system to receive data output from each memory at fixed timing. More specifically, in a memory system satisfying time tclk<time (tcm+ta+tcm) wherein tcm indicates signal delay time between a memory and memory controller 5 which is a clock signal source, ta indicates time for data access in the memory, and tclk indicates the cycle of the clock signal, the timing skew of data output from each memory into memory controller 5 exceeds one cycle of the clock signal. Accordingly, memory controller 5 cannot always receive data in accordance with the clock edge subsequent to that for outputting data from the memory.

Thus, in the conventional memory system, the need for a higher data transfer rate and an increased frequency of the clock signal give rise to the problem of the timing skew between data output from each memory and the clock signal.

Then, in order to eliminate the skew between the clock signal and data, it is possible to output a clock signal from a memory in synchronization with output data at the time of data output of the memory. In this case, however, the memory must be redesigned to include a clock signal generating circuit and an output buffer, leading to increase in chip area.

Furthermore, it is also possible to reduce the timing skew between clock signal and data using two kinds of clock signals, that is, clock signals for data input and for data output. In this case, however, the memory must be redesigned to independently include an input clock pin and an output clock pin in a memory device, leading to increase in chip area.

In addition, as shown in FIG. 8, data bus 9 in the conventional memory system is a bus for bi-directional data transfer, and an increased operating frequency might cause conflict of data moving in different directions.

FIG. 11A–11D are timing charts showing data conflict in data bus 9.

Figure 11A:
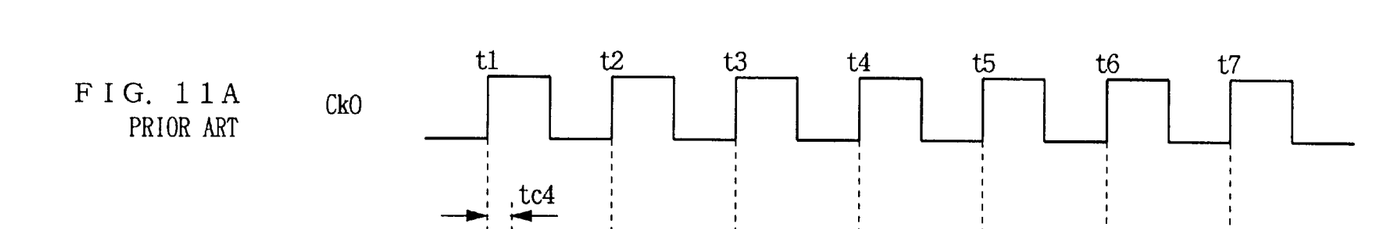
FIGS. 11A–11D are timing charts for use in illustration of data conflict in data transfer of the memory system shown in FIG. 8.
Figure 11B:
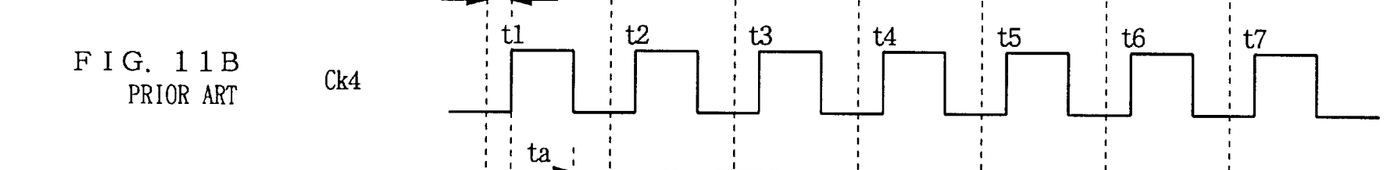
Figure 11C:
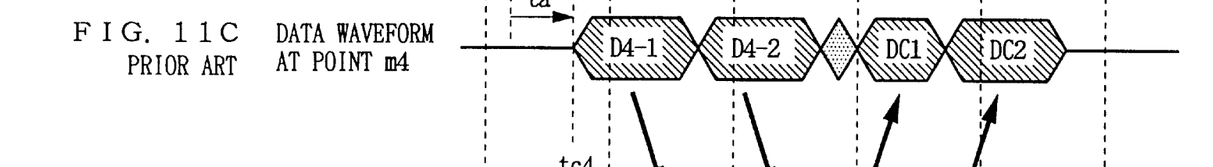

As shown in FIG. 11B and FIG. 11C, in read operation, read data D4-1 is output from memory 4 to the point m4 on data bus 9 in accordance with the clock edge t2 of clock signal Ck4, and read data D4-2 is similarly output therefrom in accordance with the clock edge t3 thereof. In addition, as shown in FIG. 11D, these read data D4-1 and D4-2 are transferred from the point m4 to the point C on data bus 9 after the passage of time tc4, and input to memory controller 5.

Figure 11D:
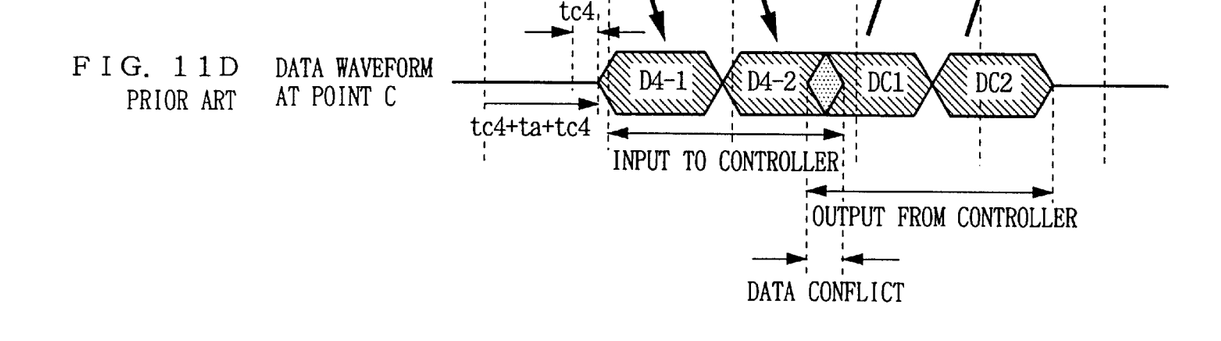

Meanwhile, as shown FIG. 11A and FIG. 11D, write data DC1 and DC2 are output from memory controller 5 to the point C on data bus 9 in response to the clock edges t4 and t5 of clock signal Ck0, respectively, In this case, as shown in FIG. 11D read data D4-2 and write data DC1 conflict with each other near the point C on data bus 9. Since the data are destroyed by the conflict, a proper period (time of effective value) of read data D4-2 and write data DC1 is reduced, causing system malfunction.

In order to avoid such data conflict, waiting time of one or more clock cycles is provided between data read and write operations in data transfer in different directions. This, however, reduces the efficiency of data transfer.

SUMMARY OF THE INVENTION

It is an object of the present invention to provide the timing skew between a clock signal and data in an existing memory system operating in synchronization with the clock signal.

It is another object of the present invention to improve the efficiency of data transfer.

According to one aspect of the present invention, a memory system includes a data bus, a memory connected to the data bas for receiving write data and outputting read data, and a memory control circuit for controlling the memory, wherein the memory control circuit outputs write data onto one end of the data bus and receives read data from another end thereof.

According to another aspect of the present invention, a memory system includes a data bus, a clock signal line extending in parallel with the data bus for transferring a clock signal, a memory connected to the data bus and the clock signal line and responsive to the clock signal for outputting read data onto the data bus, and a memory control circuit for generating a clock signal to supply it to one end of the clock signal line, and responsive to a clock signal input from another end thereof for receiving read data.

Accordingly, an advantage of the present invention is that data conflict on the data bus can be avoided, thereby improving the efficiency of data transfer.

Another advantage of the present invention is that the skew between read data and a clock signal in a memory system can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described in conjunction with the accompanying drawings. Note that the same or corresponding portions are denoted by the same reference numerals and characters in the figures.

First Embodiment

Figure 1:
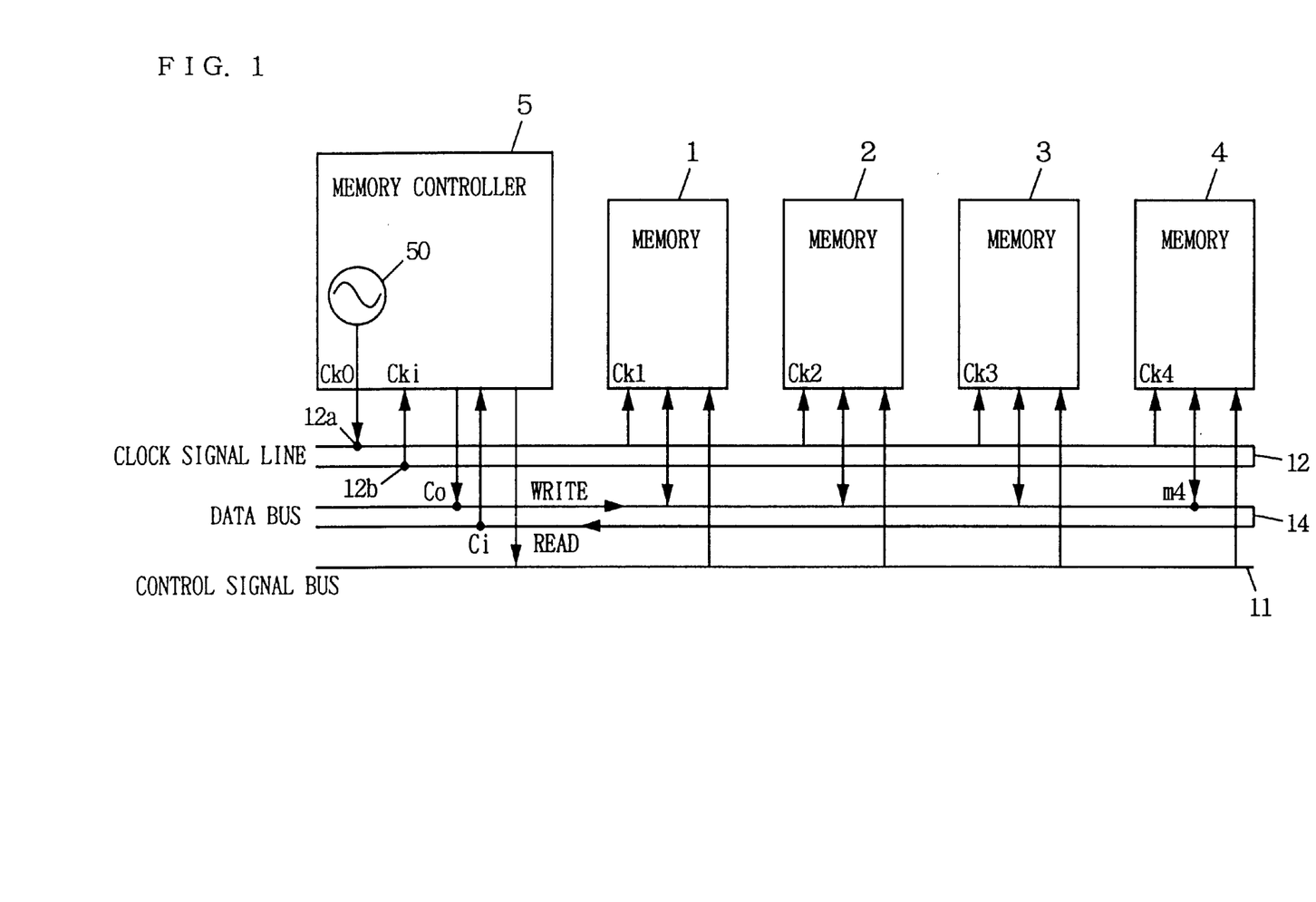
FIG. 1 is a diagram showing the structure of a memory system according to a first embodiment of the invention.

FIG. 1 is a block diagram showing the structure of a memory system according to the first embodiment of the invention.

The memory system of the first embodiment includes a data bus 14 for transferring data, a clock signal line 12 extending in parallel with data bus 14 for transferring a clock signal, a control signal bus 11 extending in parallel with data bus 14 for transferring a control signal for controlling a memory, and four memories 1–4 connected to clock signal line 12, data bus 14 and control signal bus 11.

Clock signal line 12 and data bus 14 are folded, and the memory system further includes a memory controller 5 connected to one end 12a and another end 12b of clock signal line 12, one end Co and another end Ci of data bus 14, and control signal bus 11.

Figure 2:
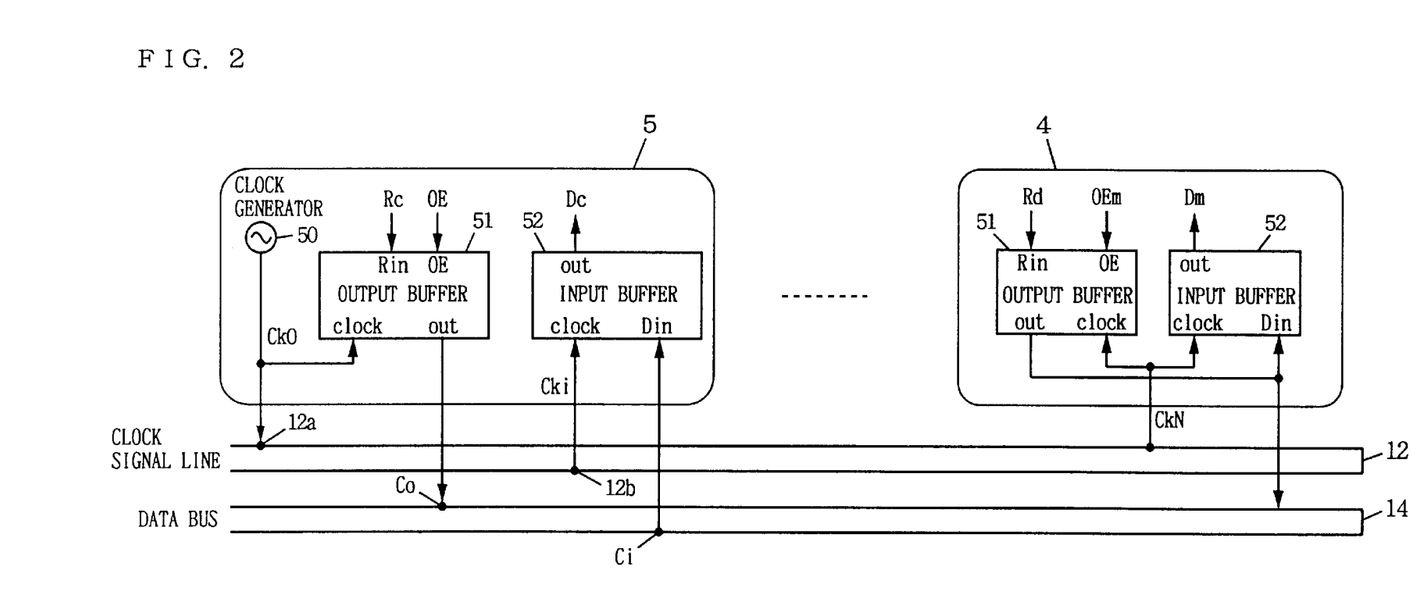
FIG. 2 is a diagram showing the specific structure of the memory system shown in FIG. 1.

FIG. 2 is a diagram showing the specific structure of the memory system shown FIG. 1. As shown in FIG. 2, memory controller 5 includes a clock generator 50, an output buffer 51, and an input buffer 52. Clock generator 50 generates a clock signal Ck0 and supplies it to one end 12a of the clock signal line and output buffer 51. In addition, output buffer 51 outputs data Rc onto one end Co of data bus 14 in response to the input of an output buffer activation signal OE. Input buffer 52 receives data from another end Ci of the data bus in response to a clock signal Cki input from another end 12b of clock signal line 12, and outputs data Dc to an internal circuit (not shown).

Meanwhile, memory 4 includes an output buffer 51 and an input buffer 52. These output buffer 51 and input buffer 52 have the structure similar to that of output buffer 51 and input buffer 52 included in memory controller 5, respectively. Output buffer 51 and input buffer 52 included in memory 4 operate in synchronization with a single clock signal CkN input from clock signal line 12. Output buffer 51 is activated by an output buffer activation signal OEm to output data Rd in synchronization with clock signal CkN. In addition, input buffer 52 receives data from data bus 14 in synchronization with clock signal CkN and outputs data Dm to an internal circuit (not show).

Figure 3:
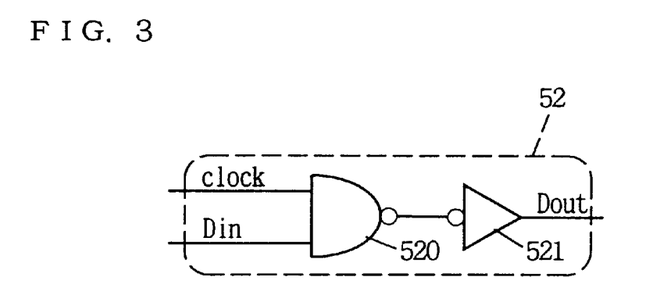
FIG. 3 is a diagram showing the structure of an input buffer shown in FIG. 2.

FIG. 3 is a circuit diagram showing the structure of input buffer 52 shown in FIG. 2. As shown in FIG. 3, input buffer 52 includes an NAND circuit 520 and an inverter 521.

Figure 4:
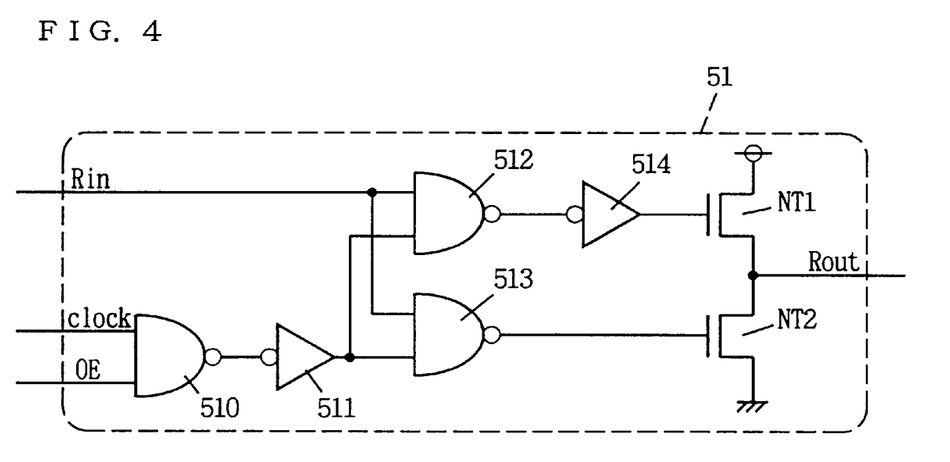
FIG. 4 is a diagram showing the structure of an output buffer shown in FIG. 2.

FIG. 4 is a circuit diagram showing the structure of output buffer 51 shown in FIG. 2. As shown in FIG. 4, output buffer 51 includes NAND circuits 510, 512, and 513, inverters 511 and 514, and NMOS transistors NT1 and NT2.

Note that a memory system including at least one memory and a plurality of memory controllers 5 may be used instead of the above-described memory system.

Each of memories 1 to 4 is a memory for reading or writing data in synchronization with a clock signal, such as a dynamic random access memory (DRAM), a static random access memory (SRAM), a read only memory (ROM), and a plurality of memories constituting the system may have different characteristics.

Operation of the memory system according to the first embodiment will now be described with reference to the timing charts of FIG. 5A–5G.

Figures 5A, 5B:
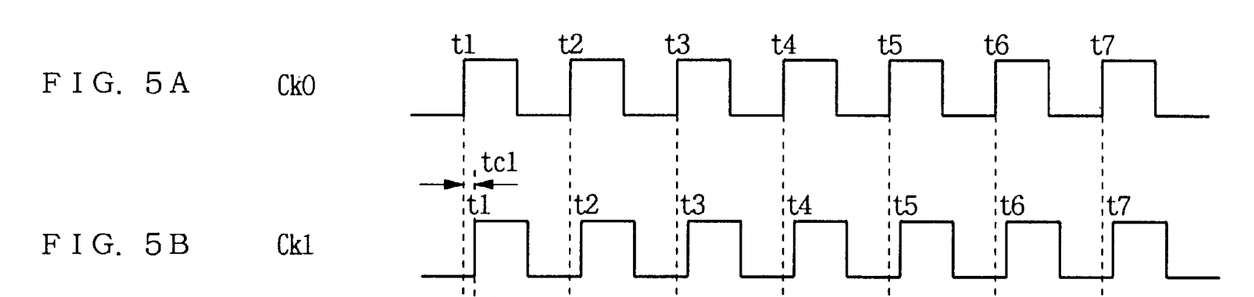
FIGS. 5A–5G are timing charts for use in illustration of reduction in skew in operation of the memory system shown in FIG. 1.

Memory controller 5 includes clock generator 50 for generating clock signal Ck0, and supplies clock signal Ck0 of FIG. 5A generated at clock generator 50 onto one end 12a of the clock signal line.

This clock signal Ck0 passes from one end 12a to another end 12b across clock signal line 12, and input as clock signal Ckn (n=1 to 4) to memory n (n=1 to 4).

Figure 5C:
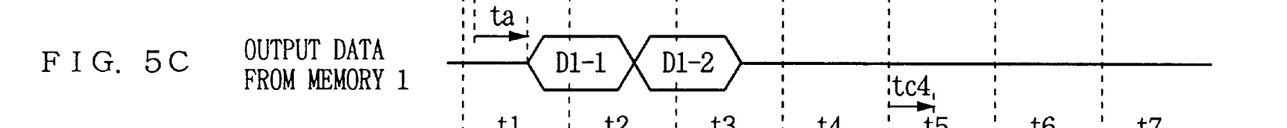

For example, a clock signal Ck1 input to memory 1 delays for time tc1 with respect to clock signal Ck0, as shown in FIG. 5A and FIG. 5B. In data read operation, memory 1 outputs data D1-1 in response to the clock edge t1 of clock signal Ck1, after the passage of data access time ta, as shown in FIG. 5C. In addition, memory 1 outputs data D1-2 successively after data D1-1 in response to the clock edge t2 of clock signal Ck1.

Figure 5D:
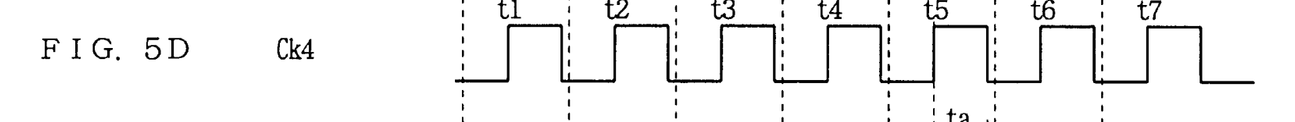
Figure 5E:
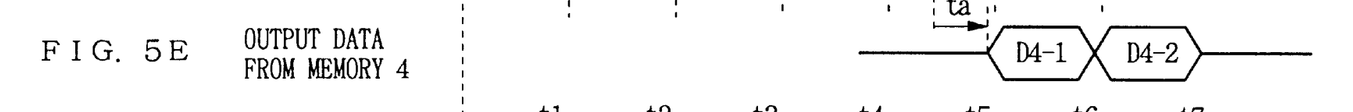

Meanwhile, as shown in FIG. 5D, clock signal Ck0 is input to memory 4 with delay time tc4. Memory 4 operates in synchronization with a clock signal Ck4 shown in FIG. 5D, and in data read operation, outputs data D4-1 after the passage of time ta from the clock edge t5 of clock signal Ck4. In addition, memory 4 outputs data D4-2 successively after data D4-1 in response to the clock edge t6 of clock signal Ck4.

Then, the data thus output from the memory are transferred through data bus 14 in the same direction as the transfer direction of clock signal Ck0.

Furthermore, since clock signal line 12 and data bus 14 are folded, clock signal Ck0 and data are each transferred only in a fixed direction.

In this case, clock signal Ck0 supplied to one end 12a of clock signal line 12 is transferred through clock signal line 12, and input as clock signal Cki from another end 12b of clock signal line 12 to memory controller 5.

Memory controller 5 receives data output from memory n (n=1 to 4) at the point Ci on data bus 14, in response to clock signal Cki.

Figure 5F:
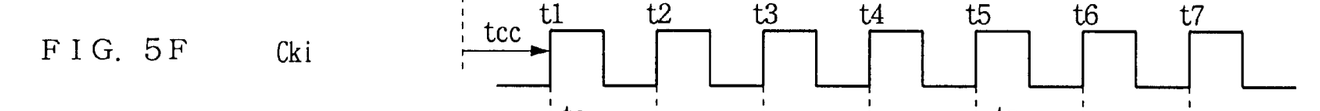
Figure 5G:
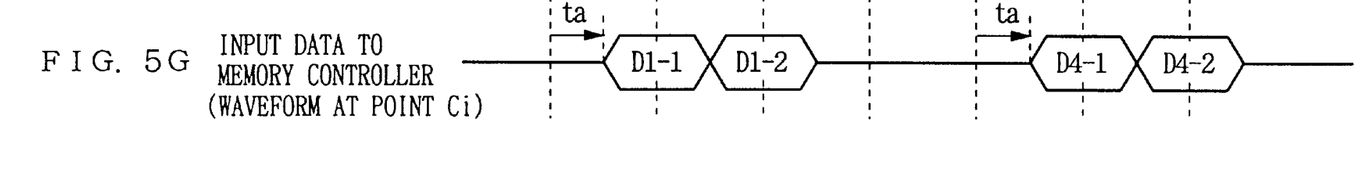

Thus, since clock signal Ck0 and data are transferred through clock signal line 12 or data bus 14 extending in parallel with each other, the phase relation between clock signal Cki and data D1-1 and D1-2 shown in FIG. 5F and FIG. 5G is the same as that between clock signal Ck1 and data D1-1 and D1-2 shown in FIG. 5B and FIG. 5C. In addition, the phase relation between clock signal Cki and data D4-1 and D4-2 shown in FIG. 5F and FIG. 5G is the same as that between clock signal Ck4 and data D4-1 and D4-2 shown in FIG. 5D and FIG. 5E.

Therefore, the timing skew between the clock signal and data which is output from each memory is reduced. In addition, the timing skew can be reduced without adding a clock signal for skew reduction. Furthermore, the timing skew can be reduced with the conventional memory interface without adding an input clock pin and an output clock pin to the memory device.

Data transfer on data bus 14 will now be described with reference to the timing charts of FIGS. 6A–6F.

Figure 6A:
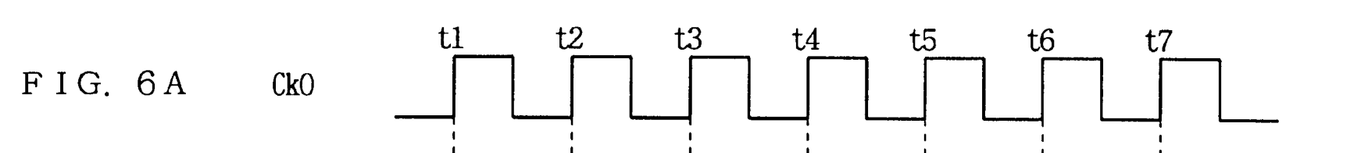
FIGS. 6A–6F are timing charts for use in illustration of avoidance of data conflict in the memory system shown in FIG. 1.
Figure 6B:
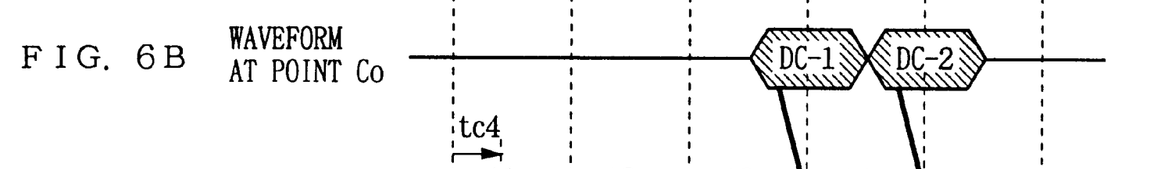
Figures 6C, 6D:
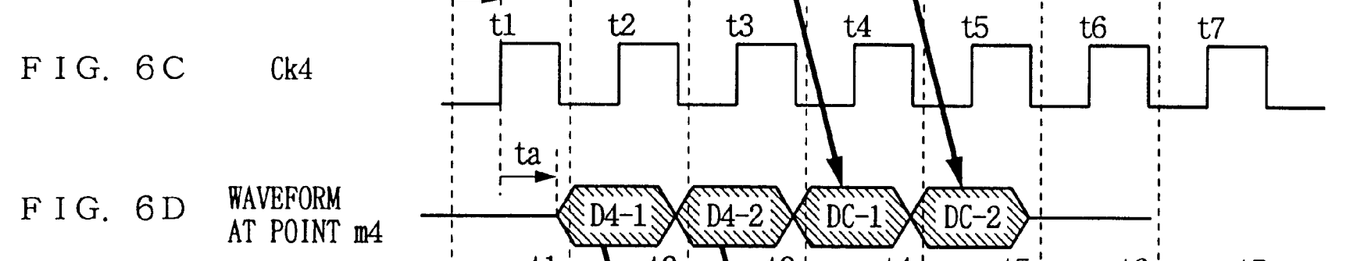
Figure 6E:
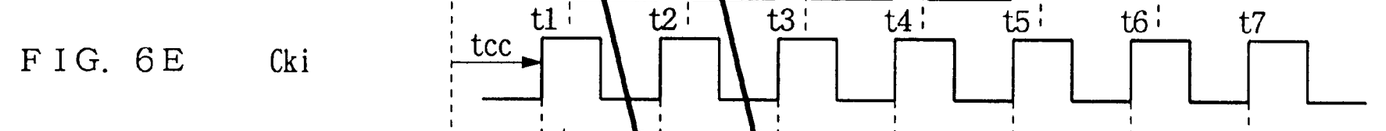

As shown in FIG. 6C and FIG. 6D, memory 4 outputs data D4-1 and D4-2 to the point m4 on data bus 14 in response to the clock edges t2 and t3 of input clock signal Ck4, respectively. In addition, as shown in FIG. 6A and FIG. 6B, data DC-1 and DC-2 to be written to memory 4 are output from memory controller 5 to one end Co of data bus 14 in response to the clock edges t4 and t5 of clock signal Ck0, respectively.

Figure 6F:
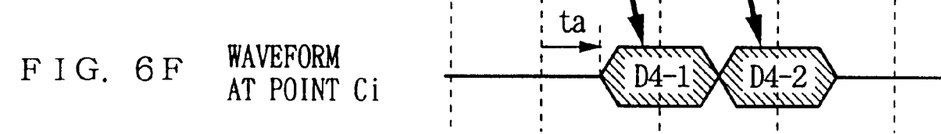

In this case, since data bus 14 is folded to transfer data only in a single direction, data D4-1 and D4-2 are transferred from the point m4 to another end Ci of data bus 14, as shown in FIG. 6D and FIG. 6F. Therefore, as shown in FIG. 6D, conflict of data D4-2 output from memory 4 with data DC-1 output from memory controller 5 to be input to memory 4 is avoided.

Thus, data transfer on data bus 14 is carried out in a single direction, whereby the waiting time does not need to be provided between data read operation from memory n(n=1 to 4) to memory controller 5 and data write operation from memory controller 5 to memory n(n=1 to 4), improving the efficiency of data transfer.

Second Embodiment

Figure 7:
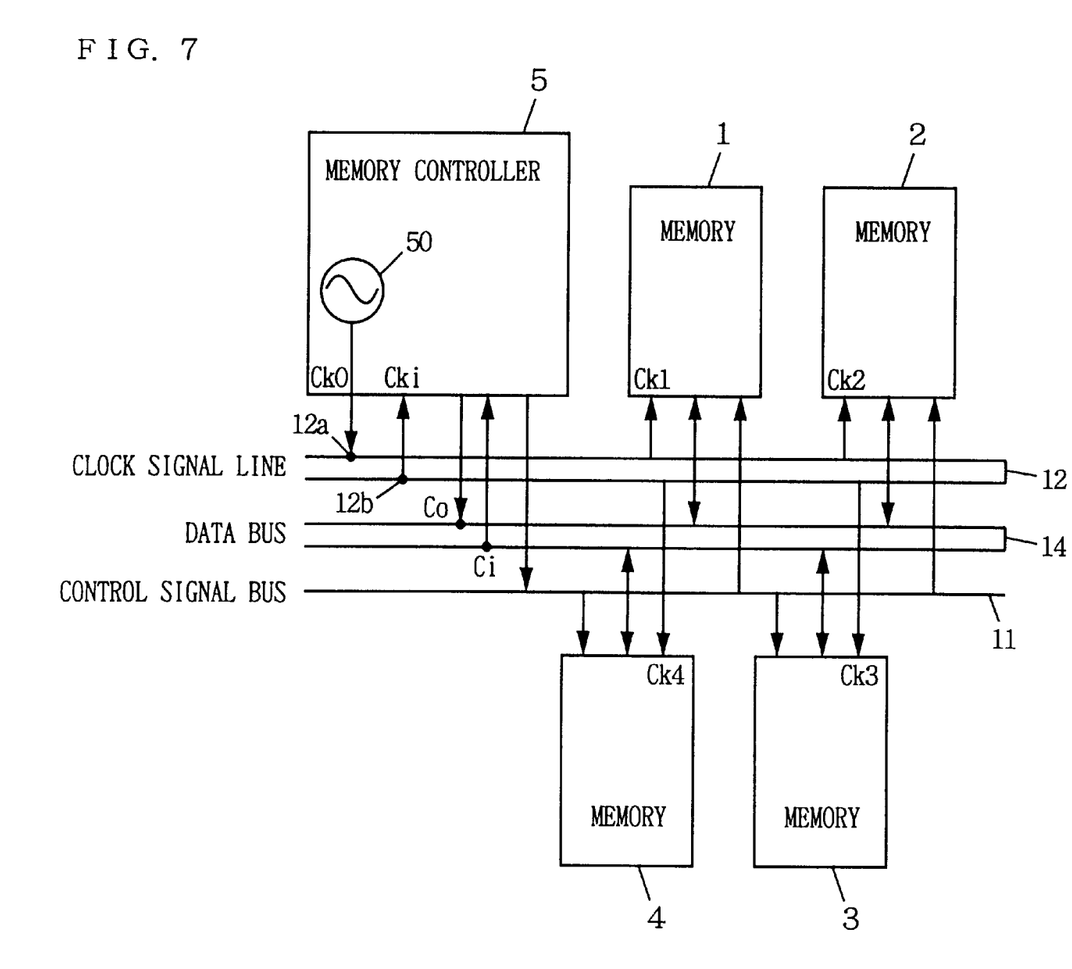
FIG. 7 is a diagram showing the structure of a memory system according to a second embodiment of the invention.

FIG. 7 is a block diagram showing the structure of a memory system according to the second embodiment of the invention.

The memory system of the second embodiment has a structure similar to that of the memory system of the first embodiment except arrangement of memories 1 to 4.

More specifically, the memory system according to the second embodiment includes a data bus 14 folded for transferring data, a clock signal line 12 extending in parallel with data bus 14 for transferring a clock signal, memories 1 to 4 connected to data bus 14 and clock signal line 12 and arranged on both sides of data bus 14 and clock signal line 12, a memory controller 5 for generating a clock signal Ck0 to supply it to one end 12a of clock signal line 12, and receiving data read from the memory from another end Ci of data bus 14 in response to a clock signal Cki input from another end 12b of clock signal line 12, and a control signal bus 11 for transferring a control signal output from memory controller 5 to the memory.

The memory system according to the second embodiment has memories 3 and 4 arranged on the side opposite to memories 1 and 2 with respect to clock signal 12, data bus 14 and control signal bus 11, as shown in FIG. 7.

Therefore, according to the memory system of the second embodiment, the length of clock signal line 12 and data bus 14 can be reduced as compared with the memory system of the first embodiment having memories 1 to 4 arranged on one side of clock signal line 12, data bus 14 and control signal bus 11.

In the memory system of the second embodiment, memories 1 and 2 receive clock signal Ck0 transferred between one end 12a of the clock signal line and the fold thereof, and memories 3 and 4 receive clock signal Ck0 transferred between the fold of the clock signal line 12 and another end 12b thereof. In addition, while memories 1 and 2 receive and output data between one end Co of data bus 14 and the fold thereof and memories 3 and 4 receive and output data between the fold of data bus 14 and another end Ci of data bus 14, operation of the memory system according to the second embodiment is similar to that of the memory system according to the first embodiment.

Note that memory modules may be used instead of the memories in the first and second embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory system, comprising:

a data bus;

a memory connected to said data bus for receiving write data and outputting read data; and memory control means for controlling said memory, wherein said memory control means outputs said write data onto one end of said data bus and receives said read data from another end of said data bus.

2. The memory system as recited in claim 1, wherein said data bus is folded.

3. A memory system, comprising:

a data bus;

a clock signal line extending in parallel with said data bus for transferring a clock signal;

a memory connected to said data bus and said clock signal line, and responsive to said clock signal for outputting read data onto said data bus; and memory control means for generating said clock signal to supply said generated clock signal onto one end of said clock signal line, and responsive to said clock signal from another end of said clock signal line for receiving said read data;

wherein said memory control means outputs write data onto one end of said data bus and receives said read data from another end of said data bus.

4. The memory system as recited in claim 2, wherein said memory control means includes a clock signal generator, an output buffer, and an input buffer, wherein said clock signal generator is configured to supply said generated clock signal to one end of said clock signal line and said output buffer, said output buffer outputs write data onto said data bus in response to said clock signal, and said input buffer receives said read data in response to said clock signal from another end of said clock signal line.

5. The memory system as recited in claim 3, wherein said data bus is folded.

6. The memory system as recited in claim 3, wherein said clock signal line is folded to form a forward path and a backward path, said data bus is folded to form a forward path and a backward path, and said memory receives said clock signal from the backward path of said clock signal line, outputs said read data onto the backward path of said data bus, and receives said write data from the back ward path of said data bus.

7. The memory system as recited in claim 6, wherein said forward path of said clock signal line has only one end, said backward path of said clock signal line has only an opposite end, said forward path of said data bus has only one end corresponding to said only one end of said forward path of said clock signal line, and said backward path of said data bus has only an opposite end corresponding to said opposite end of said backward path of said clock signal line.

8. The memory system as recited in claim 3, wherein said clock signal line is folded to form a forward path and a backward path, said data bus is folded to form a forward path and a backward path, and said memory receives said clock signal from the forward path of said clock signal line, outputs said read data onto the forward path of said data bus, and receives said write data from the forward path of said data bus.

9. The memory system as recited in claim 8, wherein said forward path of said clock signal line has only one end, said backward path of said clock signal line has only an opposite end, said forward path of said data bus has only one end corresponding to said only one end of said forward path of said clock signal line, and said backward path of said data bus has only an opposite end corresponding to said opposite end of said backward path of said clock signal line.

10. A memory system, comprising:

a data bus which is folded;

a clock signal line extending in parallel with said data bus for transferring a clock signal;

a plurality of memories connected to said data bus and said clock signal line and arranged on both sides of said data bus and said clock signal line; and memory control means for generating said clock signal to supply said generated clock signal to one end of said clock signal line, and responsive to said clock signal from another end of said clock signal line for receiving said read data.

* * * * *